United States Patent
Ostrom et al.

(10) Patent No.: US 6,710,989 B2
(45) Date of Patent: Mar. 23, 2004

(54) METHOD APPARATUS, AND SYSTEM FOR SENSING A POWER CHANGE DURING OPERATION OF A MICROELECTRONIC DEVICE

(75) Inventors: Kenneth Ostrom, Palos Verdes Estates, CA (US); Benjamin Tang, Hawthorne, CA (US); Tim Ng, Monterey Park, CA (US); Keith Nelson Bassett, Torrance, CA (US)

(73) Assignee: Primarion, Inc., Tempe, AZ (US)

( * ) Notice: Subject to any disclaimer, the term of this patent is extended or adjusted under 35 U.S.C. 154(b) by 33 days.

(21) Appl. No.: 10/222,421

(22) Filed: Aug. 16, 2002

(65) Prior Publication Data

US 2003/0034792 A1 Feb. 20, 2003

Related U.S. Application Data

(60) Provisional application No. 60/313,165, filed on Aug. 17, 2001.

(51) Int. Cl.$^7$ ............... H02H 3/00; H02H 7/00
(52) U.S. Cl. .................. 361/42; 361/63
(58) Field of Search .............. 323/284, 282, 323/283, 285, 286, 288; 361/45, 42, 311, 94, 115, 63, 180

(56) References Cited

U.S. PATENT DOCUMENTS

| | | | | |
|---|---|---|---|---|
| 4,868,704 A | * | 9/1989 | Cavero | 361/180 |
| 4,980,799 A | * | 12/1990 | Tobita | 361/311 |
| 5,224,006 A | * | 6/1993 | MacKenzie et al. | 361/45 |
| 5,691,869 A | * | 11/1997 | Engel et al. | 361/42 |
| 5,986,860 A | * | 11/1999 | Scott | 361/42 |

* cited by examiner

*Primary Examiner*—Rajnikant B. Patel
(74) *Attorney, Agent, or Firm*—Snell & Wilmer L.L.P.

(57) ABSTRACT

A sense circuit and a system including a sense circuit are disclosed. The sense circuit is configured to measure and change in current with respect to time and/or a change in voltage across a portion of a substrate.

21 Claims, 4 Drawing Sheets

METHOD APPARATUS, AND SYSTEM FOR SENSING A POWER CHANGE DURING OPERATION OF A MICROELECTRONIC DEVICE

CROSS-REFERENCE TO RELATED APPLICATIONS

This application claims priority to and the benefit of U.S. Provisional Patent Application Ser. No. 60/313,165, entitled "SENSE LINE LAYOUT" and filed on Aug. 17, 2001.

TECHNICAL FIELD

The present invention generally relates to microelectronic power regulation systems and components. More particularly, the invention relates to devices and systems for sensing power changes during operation of a microelectronic device.

BACKGROUND INFORMATION

Microelectronic power regulation systems generally include a power regulator configured to supply a desired, regulated power to a microelectronic device such as microprocessors, microcontrollers, memory devices, and the like. The system may also include capacitors located near and/or packaged with the microprocessor to supply additional charge during the operation of the microprocessor. Such power regulation systems are configured so that the power regulator (e.g., a switching regulator such as a Buck regulator) provides nominal operating power to the microprocessor and the capacitors supply charge to compensate for transient power demands that result from operation of the microelectronic device. Such transient power demands may occur, for example, when several transistors of the microprocessor switch in the same direction at approximately the same time—e.g., when a portion of the device is powered off to conserve power or a portion of the device is activated.

As the speed and integration of microprocessors increase, the use of power regulation systems that only employ decoupling capacitors to compensate for or regulate transient power demands becomes increasingly problematic. For example, the number and/or size of the capacitors required to account for transient events generally increases as the integration of the microprocessor increases. The capacitors take up a relatively large amount of space on the package and can be relatively expensive. In addition, as the speed and the performance of the microprocessor increases, the severity (e.g., the amplitude) of the transient power demands and the frequency of the events tend to increase. Further, the microelectronic devices often become more sensitive to degraded power waveforms, which result from transient events, as the integration and speed of the devices increase. Capacitors within typical power regulation systems may be unable to adequately regulate such severe transient power demands. If not regulated or filtered, transient power events may result in a power or ground "spike" or "bounce"—i.e., momentary voltage levels below or above the nominal operating voltage of the microelectronic device, which in turn induces bit errors in digital logic of the microelectronic device through degraded noise margin and supply-induced timing violations. Accordingly, improved apparatus for responding to transient events that result during operation of a microelectronic device are desired.

SUMMARY OF THE INVENTION

The present invention provides improved apparatus and techniques for sensing transient power demands during operation of a microelectronic device. When used in conjunction with power regulators, the sensing devices and techniques of the present invention allow for fast power regulation in response to sensed changes in power demand.

While the way in which the present invention addresses the disadvantages of the prior art will be discussed in greater detail below, in general, the present invention provides devices to measure change in current with respect to time (di/dt) and/or changes in voltage that occur during operation of a microelectronic device.

In accordance with one embodiment of the invention, the sense circuit is configured to reject or discount noise that is present on both a voltage supply line and a ground line. In accordance with one aspect of this embodiment, the circuit is configured to be substantially symmetrical, such that the inductance and resistance of the sense circuit portion on the voltage supply line or plane is substantially identical to the inductance and resistance on the ground sense circuit portion on the ground line or plane.

In accordance with another embodiment of the invention, the sense circuit is configured to minimize or reduce single-ended noise injection from either the supply voltage or the ground line. In accordance with one aspect of this embodiment of the invention, the sense circuit portion on the power supply line and portion on the ground line are substantially symmetric and spaced close to each other.

In accordance with yet another embodiment of the invention, a signal representative of a sensed power deviation is amplified. In accordance with one aspect of this embodiment of the invention, the sense signal is amplified by measuring di/dt across a relatively large inductor—such as parasitic inductance on a printed circuit board. In accordance with another aspect of this embodiment, di/dt signals from multiple lines are added together to amplify the signal associated with the rate of change of current.

In accordance with a further embodiment of the invention, the change in voltage is measured proximate the load, such that the measured change in voltage is indicative of the change in voltage at the load.

BRIEF DESCRIPTION OF THE DRAWINGS

A more complete understanding of the present invention may be derived by referring to the detailed description, considered in connection with the figures, wherein like reference numbers refer to similar elements throughout the figures, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

The present invention is described herein in terms of various functional components. It should be appreciated that such functional components may be realized by any number of hardware or structural components configured to perform the specified functions. For example, the present invention may employ various integrated components comprised of various electrical devices, e.g., inductors, resistors, transistors, capacitors, diodes and the like, whose values may be suitably configured for various intended purposes. In addition, the present invention may be practiced in any application in which power sense circuits are employed. Such general applications, which are appreciated by those skilled in the art in light of the present disclosure, are not described in detail. Further, it should be noted that while various components may be suitably coupled or connected to other components within exemplary circuits, such connections and couplings can be realized by direct connection between components or by connection through other components and devices located therebetween.

The present invention provides power sense schemes for measuring deviations in power supplied over one or more power and/or ground lines. While the invention may be practiced in connection with a variety of electrical systems, the invention is conveniently described in connection with power regulation circuits and systems.

Figure 1:
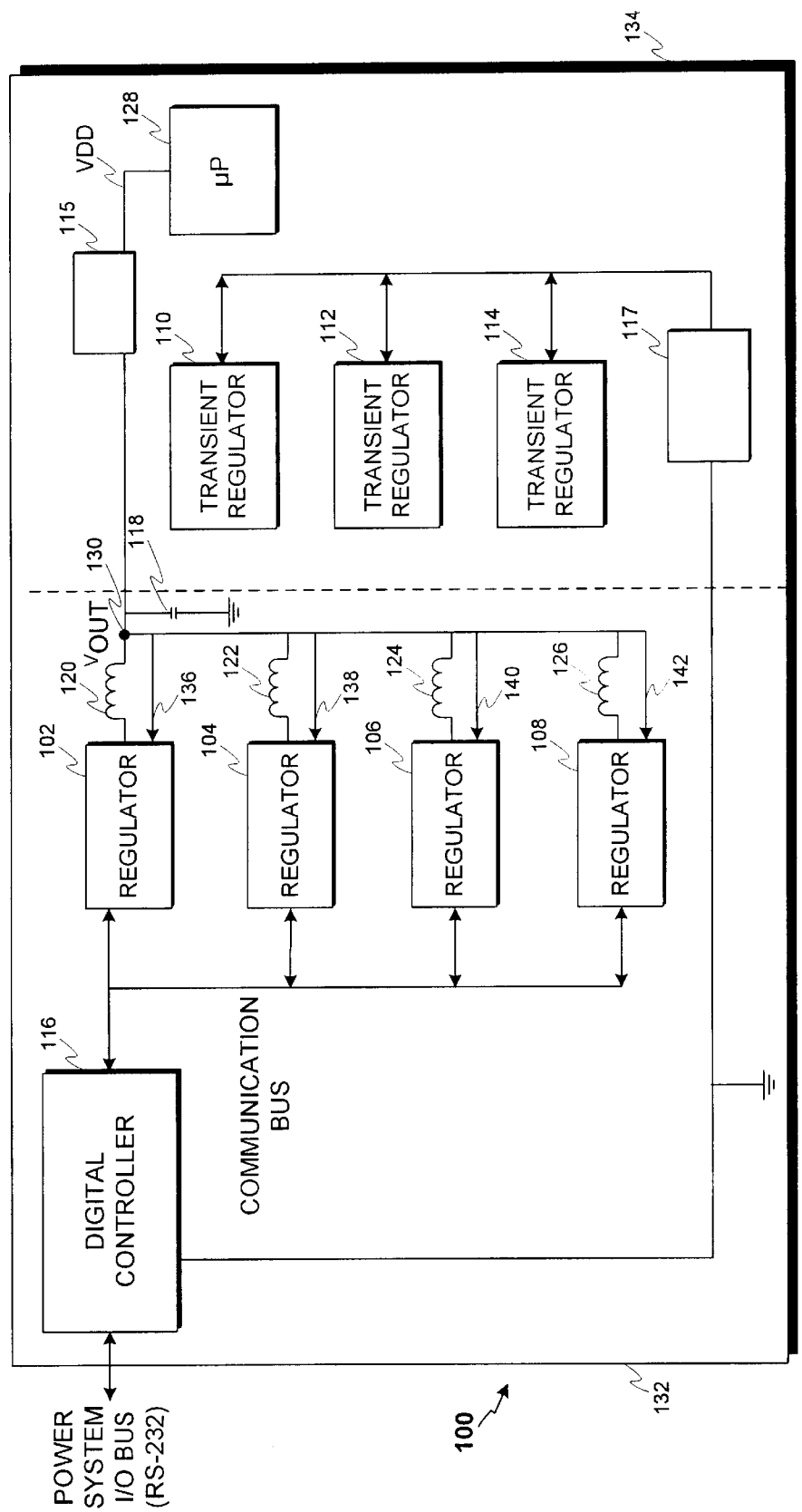
FIG. 1 illustrates a power regulation system, including a sense circuit, in accordance with the present invention.

FIG. 1 illustrates a power regulation system 100, including sense circuits in accordance with various embodiments of the invention. System 100 includes primary power regulators 102–108, transient suppression regulators 110–114, a controller 116, and sense circuit portions 115 and 117. System 100 may also suitably include one or more capacitors 118 and one or more inductors 120–126 coupled to a load 128 (e.g., a microprocessor). The capacitors and inductors may comprise discrete components and/or may symbolize inherent inductance and capacitance within system 100. Although exemplary system 100 is illustrated with four primary regulators 102–108, three transient regulators 110–114, four inductors 120–126, and one capacitor 118, power regulation systems may include any suitable number of primary regulators, transient suppression regulators, inductors, and capacitors. Furthermore, power regulation systems may include additional components, such as resistors, transistors, additional capacitors and/or inductors, and the like, which are not illustrated in the drawing figures.

In operation, system 100 provides operating power to load 128 and also responds to transient events caused by the operation of the load, e.g., a power surge due to, for example, multiple gates within the microprocessor switching in the same direction at about the same time or from a portion of the microprocessor powering up or down. More specifically, operating power and low-frequency (e.g., less than about 100 kHz) transient suppression power is supplied to the microprocessor via regulators 102–108 and transient suppression regulators 110–114 supply high-frequency (e.g., greater than about 100 kHz) transient suppression power to the power supply circuit. As discussed in more detail below, regulators 102–108 may be configured to alter operation to respond to actual or predicted transient events and transient suppression regulators 110–114 may be configured to supply power in response to actual or predicted transient power demands from the load, such that any spikes or droops that would otherwise occur on the power circuit are reduced or eliminated.

As noted above, primary regulators 102–108 are configured to provide nominal operating power to microprocessor 128 and to provide low frequency transient suppression. By way of particular example, regulators 102–108 may be configured to provide about 1.1 volts±about ten percent at about 100 amps±ten percent to microprocessor 128 and respond to transient events occurring at less than about 100 kHz. However, regulators having other output voltages and current levels are within the scope of the present invention.

Regulators 102–108 may be configured in a variety of ways, such as, for example, a linear regulator, or a single or multi-phase switching regulator. In accordance with one exemplary embodiment of the invention, regulators 102–108 are three or four phase switching regulators tied to a common voltage node 130, through inductors 120–126. In accordance with alternate embodiments of the invention, regulators 102–108 may be replaced with a single multi-phase switching regulator. An exemplary primary regulator suitable for use with the present invention is described in greater detail in application Ser. No. 09/975,195, entitled SYSTEM AND METHOD FOR HIGHLY PHASED POWER REGULATION, filed Oct. 10, 2001, and application Ser. No. 10/103,980, entitled, SYSTEM, DEVICE AND METHOD FOR PROVIDING VOLTAGE REGULATION TO A MICROELECTRONIC DEVICE, filed Mar. 22, 2002, the contents of which are hereby incorporated herein by reference. Regulators 102–108 may be formed on a single substrate as part of an array or on separate substrates as discrete components. In either case, regulators 102–108 may be coupled to another substrate (e.g., a substrate 132), such as a motherboard or an interposer. In addition, regulators 102–108 may suitably include feedback loops, represented by lines 136–142, to facilitate accurate control of the voltage at node 130. In accordance with one aspect of this embodiment, regulators 102–108 form an array configured to provide about 15 amps or more of power at about 1 MHz switching speed.

Transient regulators 110–114 may also be configured in a variety of ways in accordance with various embodiments of the invention. In general, regulators 110–114 are configured to quickly respond to fast, high frequency power demands. In other words, secondary regulators 110–114 are configured to reduce power spikes or droops in system 100 by providing or sinking power in response to transient power events. In accordance with various embodiments of the invention, regulators 110–114 are configured to sink and/or source current in response to a signal indicative of a transient response. In accordance with other aspects of this embodiment, each transient regulator 110–114 is configured to independently respond to transient events that occur at one or more portions of microprocessor 128.

Figure 2:
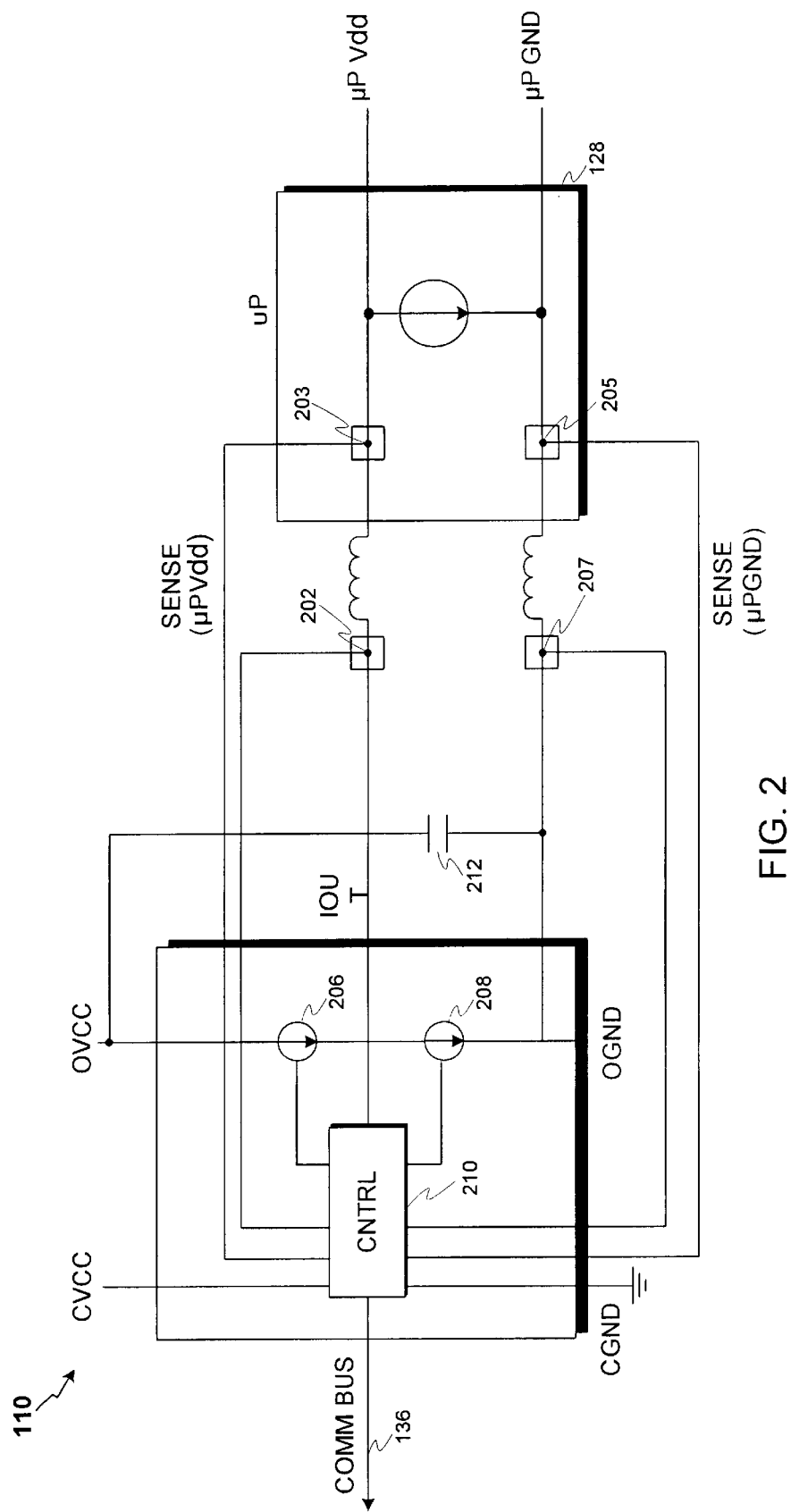
FIG. 2 illustrates an exemplary transient suppression regulator and sense circuit in accordance with the present invention.

FIG. 2 schematically illustrates a transient power regulator (e.g., regulator 110) in greater detail. In accordance with this illustrated embodiment, transient regulator 110 interacts with sense circuit portions that are used to measure a change in power at one or more sense points 202, 203, 205, and 207. Regulator 110 includes a current source 206, a current sink 208, and a controller 210. In operation, a change in power is detected at one or more of points 202, 203, 205, and 207, and a representative signal is transmitted from at least one of the sense points to controller 210, which sends a corresponding signal to one or more of sources 206–208 to sink or supply charge in response to the sensed transient power event.

The system illustrated in FIG. 2 also includes a capacitor 212, e.g., a charge-well capacitor. In accordance with one aspect of this exemplary embodiment of the invention, capacitor 212 is formed as part of regulator 110 and serves as a local charge storage device that is used to assist with regulation of transient power events. As illustrated, capacitor 212 is replenished through an OVDD connection to a separate power supply, which need not have the high current and transient suppression requirements of the supply for load 128.

Figure 3:
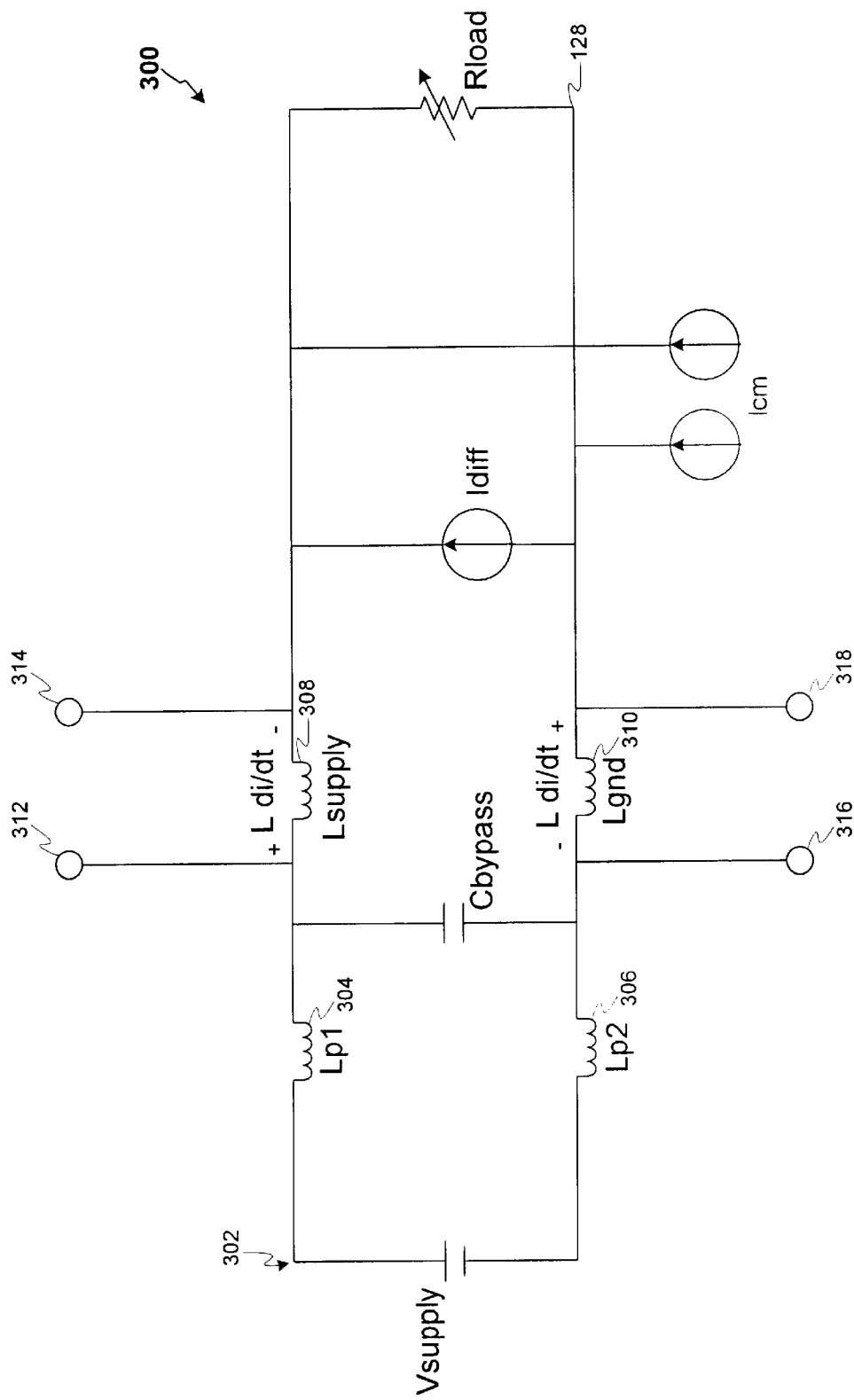
FIG. 3 schematically illustrates a power regulation system with sense points in accordance with the present invention.
Figure 4:
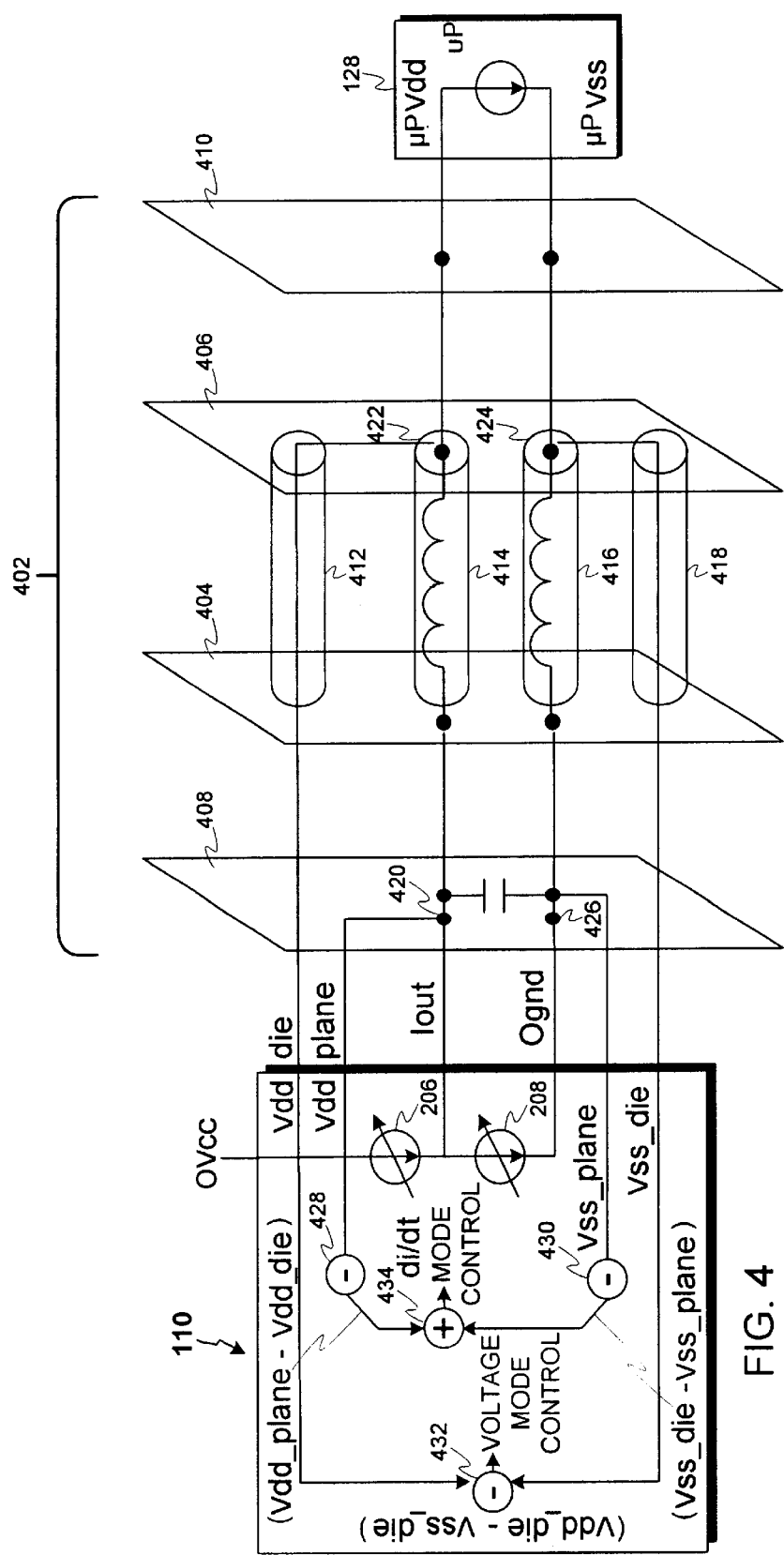
FIG. 4 illustrates a transient suppression regulator coupled to a substrate, including inductors that form part of a sense circuit, in accordance with the present invention.

FIGS. 3 and 4 illustrate systems including sense circuits in accordance with exemplary embodiments of the present invention, which may be used to, for example, sense a change in power at any of sense points 312–318, which correspond to points 202, 203, 205, and 207, illustrated in FIG. 2. Power regulation systems may include one or more of the circuits represented in FIGS. 3 and 4, and in some cases preferably include at least one voltage sense circuit and one di/dt sense circuit. In accordance with various embodiments of the invention, the sense circuits and output devices operate in a nonlinear fashion to reduce the error voltage during fast changes in the dynamic load current. In this case, the output is typically either zero (or some negligible low value relative to the load current) or maximum amplitude (e.g., programmable in multiples of, for example 1.5 amps—i.e., 1.5A, 3.0 A, 4.5A . . . up to about 12A). The output device may be controlled by a nonlinear sense circuit that causes full switching of the output device as soon as the error voltage exceeds a predetermined threshold, in which case the magnitude of the output current is independent of the magnitude of the error voltage.

FIG. 3 illustrates a regulation system 300, which is useful to illustrate the sense circuits of the present invention. As illustrated, system 300 includes a power supply 302, which may be a primary and/or secondary regulator as described above, inductors 304, 306, and inductors 308, 310, coupled to load 128. In the illustrated system, inductors 304–310 represent inherent inductance in portions of system 300 and inductors 306 and 310 are coupled to ground and inductors 304 and 308 are coupled to a power line (e.g., to Vdd).

In accordance with one embodiment of the invention, di/dt is sensed by measuring a voltage drop across inductor 308 (at sense points 312 and 314) and/or a voltage drop across inductor 310 (at sense points 316 and 318). In accordance with one aspect of this embodiment, to increase a signal associated with di/dt, the voltage drop across inductor 308 is added to the voltage drop across inductor 310.

In accordance with another embodiment of the invention, a change in operating voltage is sensed by measuring a voltage difference between a voltage measured on the power supply line (e.g., at one or more of points 312, 314) and comparing that voltage to a voltage measured on the ground line (e.g., at one or more points 316, 318). By way of a particular example, a change in operating voltage may be obtained by measuring a voltage difference between points 314 and 318, which are proximate load 128. Measuring the voltage drop proximate the load is advantageous because it more accurately represents the fluctuations in voltage at load 128.

FIG. 4 illustrates a particular layout for the sense circuits of system 300, which are formed using inherent inductance of a substrate such as a printed circuit board 402. Circuit board 402 is illustrated as including board layers 404 and 406 and build-up layers 408 and 410. The various layers of board 402 are coupled by connections 412–418, which may include, for example, plated through holes coupling one of more layers of board 402. Although board 402 is illustrated with only two board layers and two build-up layers, printed circuit boards for use with the present invention may include any suitable number of board layers and build-up layers.

When the substrate includes a printed circuit board including plated through holes, the majority of inductance, along a conductive path including a plated through hole, is associated with the through hole itself. Thus, in accordance with the illustrated embodiment of the invention, inductors 308 and 310 correspond to plated through holes 414 and 416, respectively.

In accordance with the embodiment of the invention illustrated in FIG. 4, di/dt is sensed by measuring Vdd_plane on layer 408 at a point 420 and comparing Vdd_plane to Vdd_die measured at point 422 on layer 406 at comparator 428 (e.g., a differential amplifier) and/or measuring Vss_die on layer 406 at a point 424 and comparing Vss_die to Vss_plane measured at point 426 on layer 408 at comparator 430 (e.g., a differential amplifier). In accordance with one aspect of this embodiment, the signals from comparators 428 and 430 are added together at summer 434 to increase an overall signal transmitted to, for example, a di/dt mode controller.

In accordance with another embodiment of the invention, a change in voltage is measured by comparing Vdd_die and Vss_die at comparator 432, which sends a corresponding signal to a voltage mode controller.

While sensing di/dt and voltage differences may be obtained using sense points on other layers of board 402, placing the sense points on the board layer (other than a build-up layer) closest to the load is advantageous because it allows measurement across a through hole that extends through the entire board, which provides large inductance, and the voltage measurements are representative of the voltage near device 128. Furthermore, sensing a point within build-up layer 410 may require breaking up the power grid formed within layer 410, which is generally undesirable.

Noise that can interfere with power change measurements is illustrated as differential noise (Idiff) and common mode noise (Icm) in FIG. 3. In accordance with one aspect of the invention, common mode noise is reduced or minimized by forming system 300 such that inductors 308 and 310 are substantially identical or such that the difference between inductors 308 and 310 is accounted for in measuring the difference between the voltage drops across the inductors for di/dt measurements. Similarly, common mode noise in a voltage measurement can be reduced or minimized by making ground lines and power lines resistance in system 300 substantially equal or otherwise accounted for between the respective sense points and the respective comparators. In other words, common mode noise may be reduced by using substantially symmetrical sense lines on the ground and power planes of the system.

In accordance with another aspect of the invention, differential and/or single-ended (differential current plus common mode current) noise can be reduced or minimized by tightly coupling the ground and power planes of board 402 and/or tightly coupling the sense lines on the respective planes. For example, the ground and power planes within board 402 may be placed close to each other (e.g., within about 30 $\mu$m) and/or the sense circuit portions within each plane may be placed close to each other (e.g., w/in about 100 $\mu$m).

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) are not described in detail herein. Furthermore, the connecting lines shown in the various figures contained herein are intended to represent exemplary functional relationships and/or physical couplings between the various elements. Many alternative or additional functional relatioships or physical connections may be present in the power regulation systems and sense circuits of the present invention.

The present invention has been described above with reference to exemplary embodiments. Those skilled in the art having read this disclosure will recongnize that changes and modifications may be made to the embodiments without departing from the scope of the present invention. For instance, the present invention has been described in connection with power regulation systems for providing power to a microprocessor; howerver, the sense circuits described herein may be used in connection with any system in which it is desirable to sense a change in power. These and other changes or modifications are intended to be included within the scope of the present invention, as expressed in the following claims.

We claim:

1. A system including a sense circuit, the system comprising:
    a substrate having a power line and a ground line;
    a plurality of first sense points on the power line for measuring a change in current with respect to time on the power line;
    a plurality of second sense points on the ground line for measuring a change in current with respect to time on the ground line;
    a first comparator for comparing a plurality of voltages from the plurality of first sense points; and
    a second comparator for comparing a plurality of voltages from the plurality of second sense point.

2. The system of claim 1, further comprising a summer to add a signal from the first comparator and a signal from the second comparator.

3. The system of claim 1, wherein the substrate is a printed circuit board.

4. The system of claim 3, wherein at least one of the plurality of first sense points is located on a power plane of the substrate.

5. The system of claim 4, wherein the power plane is proximate a power regulator coupled to the substrate.

6. The system of claim 3, wherein at least one of the plurality of second sense points is located on a ground plane of the substrate.

7. The system of claim 6, wherein the ground plane is proximate a microelectronic device coupled to the substrate.

8. The system of claim 1, wherein one of plurality of first sense points is located on a first layer of the substrate and a second of the plurality of first sense points is located on a second layer of the substrate, the first and second layers are coupled to each other with an electrical connection, and a rate of change in current is measured by measuring a voltage drop across the electrical connection.

9. The system of claim 1, wherein one of plurality of second sense points is located on a first layer of the substrate and a second of the plurality of second sense points is located on a second layer of the substrate, the first and second layers are coupled to each other with an electrical connection, and a rate of change in current is measured by measuring a voltage drop across the electrical connection.

10. The system of claim 1, wherein one of the plurality of first sense points is coupled to a voltage comparator and one of the plurality of second sense points is coupled to the comparator, and the comparator is configured to measure a difference in the voltage at one of the plurality of first sense points and voltage at one of the plurality of second sense points.

11. The system of claim 1, wherein the substrate is coupled to a microelectronic device and to a power regulator.

12. The system of claim 1, wherein an inductance in the power line and the inductance in the ground line are substantially identical.

13. The system of claim 1, wherein the sense circuit is configured to substantially exclude noise that is present on both the power line and the ground line.

14. A circuit for measuring a change in power, the circuit comprising:
    a substrate having a power plane and a ground plane;
    a first sense point coupled to the power plane;
    a first sense point coupled to the ground plane; and
    a first comparator configured to compare a voltage at the first sense point coupled to the power plane and a voltage at the first sense point coupled to the ground plane.

15. The circuit of claim 14, wherein a rate of change of current is measured between the first sense point on the power plane and a second sense point on the power plane.

16. The circuit of claim 14, wherein a rate of change of current is measured between the first sense point on the ground plane and a second sense point on the ground plane.

17. The circuit of claim 14, wherein a first rate of change of current is measured between the first sense point on the power plane and a second sense point on the power plane and a second rate of change of current is measured between the first sense point on the ground plane and a second sense point on the ground plane.

18. The circuit of claim 17, further comprising a second comparator to compare the voltage difference between the first sense point on the power plane and the second sense point on the power plane and a third comparator to measure the voltage difference between the first sense point on the ground plane and the second sense point of the ground plane.

19. The circuit of claim 18 further comprising a summer coupled to the second comparator and the third comparator.

20. The circuit of claim 14, further comprising a first electrical connector coupled to the first sense point coupled to the power plane and the power plane and a second electrical connector coupled to the first sense point coupled to the ground plane and the ground plane, wherein the first and second electrical connectors comprise a plated through hole of a printed circuit board.

21. A system including a sense circuit, the system comprising:
    a substrate having a power line and a ground line;
    a first sense point coupled to the power line; and
    a first sense point coupled to the ground line;
    wherein the power line and the ground line are configured such that any noise produced in the system on the ground line is substantially the same as the noise produced on the power line.

* * * * *